US012529384B2

(12) United States Patent
Toni et al.

(10) Patent No.: US 12,529,384 B2
(45) Date of Patent: Jan. 20, 2026

(54) RETURN CHANNEL WITH NON-CONSTANT RETURN CHANNEL VANES PITCH AND CENTRIFUGAL TURBOMACHINE INCLUDING SAID RETURN CHANNEL

(71) Applicant: NUOVO PIGNONE TECNOLOGIE—S.R.L., Florence (IT)

(72) Inventors: Lorenzo Toni, Florence (IT); Vittorio Michelassi, Florence (IT); Alberto Guglielmo, Florence (IT); Giuseppe Gatta, Florence (IT); Andrea Panizza, Florence (IT)

(73) Assignee: Nuovo Pignone Tecnologie—SRL

( * ) Notice: Subject to any disclaimer, the term of this patent is extended or adjusted under 35 U.S.C. 154(b) by 0 days.

(21) Appl. No.: 17/759,015

(22) PCT Filed: Jan. 15, 2021

(86) PCT No.: PCT/EP2021/025012
§ 371 (c)(1),
(2) Date: Jul. 18, 2022

(87) PCT Pub. No.: WO2021/148239
PCT Pub. Date: Jul. 29, 2021

(65) Prior Publication Data

US 2023/0032288 A1 Feb. 2, 2023

(30) Foreign Application Priority Data

Jan. 23, 2020 (IT) ........................ 102020000001294

(51) Int. Cl.
*F04D 29/44* (2006.01)
*F04D 29/66* (2006.01)

(52) U.S. Cl.
CPC ......... *F04D 29/444* (2013.01); *F04D 29/448* (2013.01); *F04D 29/661* (2013.01); *F04D 29/668* (2013.01); *F05D 2260/961* (2013.01)

(58) Field of Classification Search
CPC .... F04D 29/444; F04D 29/448; F04D 29/666; F04D 29/668; F05D 2260/961
See application file for complete search history.

(56) References Cited

U.S. PATENT DOCUMENTS 3,006,603 A * 10/1961 Caruso .................. F04D 29/284 415/119
3,171,353 A 3/1965 McMahan
(Continued)

FOREIGN PATENT DOCUMENTS

CN 110107539 A 8/2019
EP 1249615 A2 * 10/2002
(Continued)

OTHER PUBLICATIONS

English machine translation of EP 1249615 A2, May 6, 2023.*
English machine translation of CN 11017539A, May 6, 2023.*
English machine translation of JP 2007-315333A, May 6, 2023.*

*Primary Examiner* — Christopher Verdier
(74) *Attorney, Agent, or Firm* — Paul Frank + Collins P.C.

(57) ABSTRACT

A return channel for a centrifugal turbo machine. The return channel includes a plurality of return channel vanes, arranged around a return channel axis. Each return channel vane includes: a leading edge at a first distance from the return channel axis, a trailing edge at a second distance from the return channel axis, the second distance being smaller than the first distance. A respective flow passage is defined between each pair of adjacently arranged return channel
(Continued)

vanes. The return channel vanes are arranged with a non-constant pitch around the return channel axis.

10 Claims, 6 Drawing Sheets

(56) References Cited

U.S. PATENT DOCUMENTS

| | | | | |
|---|---|---|---|---|
| 6,203,275 | B1 * | 3/2001 | Kobayashi | F04D 17/122<br>415/208.4 |
| 6,715,987 | B2 | 4/2004 | Rossi et al. | |
| 2005/0005606 | A1 | 1/2005 | Vrbas et al. | |
| 2009/0317248 | A1 | 12/2009 | Tanaka et al. | |
| 2010/0150709 | A1 | 6/2010 | Roduner et al. | |
| 2013/0280060 | A1 | 10/2013 | Nasir | |
| 2017/0108003 | A1 * | 4/2017 | Rusch | F04D 29/666 |
| 2018/0291927 | A1 * | 10/2018 | Kerth | F04D 29/444 |
| 2018/0347584 | A1 | 12/2018 | Larosiliere et al. | |
| 2022/0333602 | A1 * | 10/2022 | Iancu | F04D 29/684 |

FOREIGN PATENT DOCUMENTS

| | | | |
|---|---|---|---|
| EP | 2631492 | A1 | 8/2013 |
| JP | 2007315333 | A | 12/2007 |
| WO | 2015/197536 | A1 | 12/2015 |

* cited by examiner

RETURN CHANNEL WITH NON-CONSTANT RETURN CHANNEL VANES PITCH AND CENTRIFUGAL TURBOMACHINE INCLUDING SAID RETURN CHANNEL

TECHNICAL FIELD

The present disclosure concerns radial turbomachines. More specifically, embodiments of the present disclosure concern centrifugal turbomachines, such as centrifugal compressors and/or centrifugal pumps, including one or more novel bladed, i.e. vaned, return channels.

BACKGROUND ART

Centrifugal compressors are used in a variety of applications to boost the pressure of gas. Centrifugal compressors include a stationary part, such as a casing, and one or more impellers arranged for rotation in the casing. Mechanical energy delivered to the impeller(s) is transferred by the rotating impeller to the gas in form of kinetic energy. The gas accelerated by the impeller(s) flows through a diffuser circumferentially surrounding each impeller, which collects the gas flow and reduces the speed thereof, converting kinetic energy into gas pressure. If the compressor comprises a plurality of impellers, a return channel is arranged between the diffuser of an upstream impeller and the inlet of a downstream impeller, to convey gas from the upstream impeller towards the downstream impeller.

For a better guidance of the gas flow through the diffuser and the return channel and to improve pressure recovery, vaned diffusers and vaned return channels have been developed. While improving the compressor efficiency, bladed or vaned return channels generate pressure pulses, which excite vibrations in the blades of the impeller arranged downstream of the return channel. Impeller vibrations may cause failure of the impeller due to high cycle fatigue (HCF). This becomes particularly an issue when the frequency of the vibration excited by the vaned return channel in the impeller arranged downstream thereof are near to or coincident with a critical frequency of the impeller, such that resonant phenomena may be generated. Currently, in order to limit this problem, the number of return channel vanes is selected such that the frequency of the vibration induced by the return channel on the downstream impeller does not coincide with a resonance frequency of the impeller.

An improved return channel design aimed at more efficiently reducing vibrations in the compressor impellers would be welcomed in the art.

SUMMARY

According to one aspect, a novel bladed or vaned return channel for a centrifugal turbomachine, specifically a centrifugal compressor, is disclosed herein. The return channel comprises a plurality of return channel vane[s] arranged around a return channel axis. Each return channel vane comprises a leading edge and a trailing edge. A respective flow passage is defined between each pair of adjacently arranged, i.e. consecutive, return channel vanes. The return channel vanes are arranged with a non-constant pitch around the return channel axis.

According to a further aspect, a centrifugal turbomachine, specifically a centrifugal compressor is disclosed herein, which includes a stationary part, such as a casing, and at least two impellers arranged for rotation in the stationary part, i.e. in the casing. A diffuser is arranged downstream of each impeller. Moreover, a novel vaned return channel as outlined above is arranged between the first impeller and the second impeller.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

To reduce vibrations of the impeller blades in a centrifugal turbomachine, specifically in a centrifugal compressor, the blades or vanes of one, some or all of return channels of the turbomachine are arranged according to non-constant pitches, i.e. the spacing between at least one pair of return channel vanes defining a return channel flow passage is different from the spacing between at least another pair of return channel vanes defining another return channel flow passage. A non-constant pitch has a beneficial impact in terms of reduction of the amplitude of impeller blades vibration, as will be described in detail below.

Figure 1:
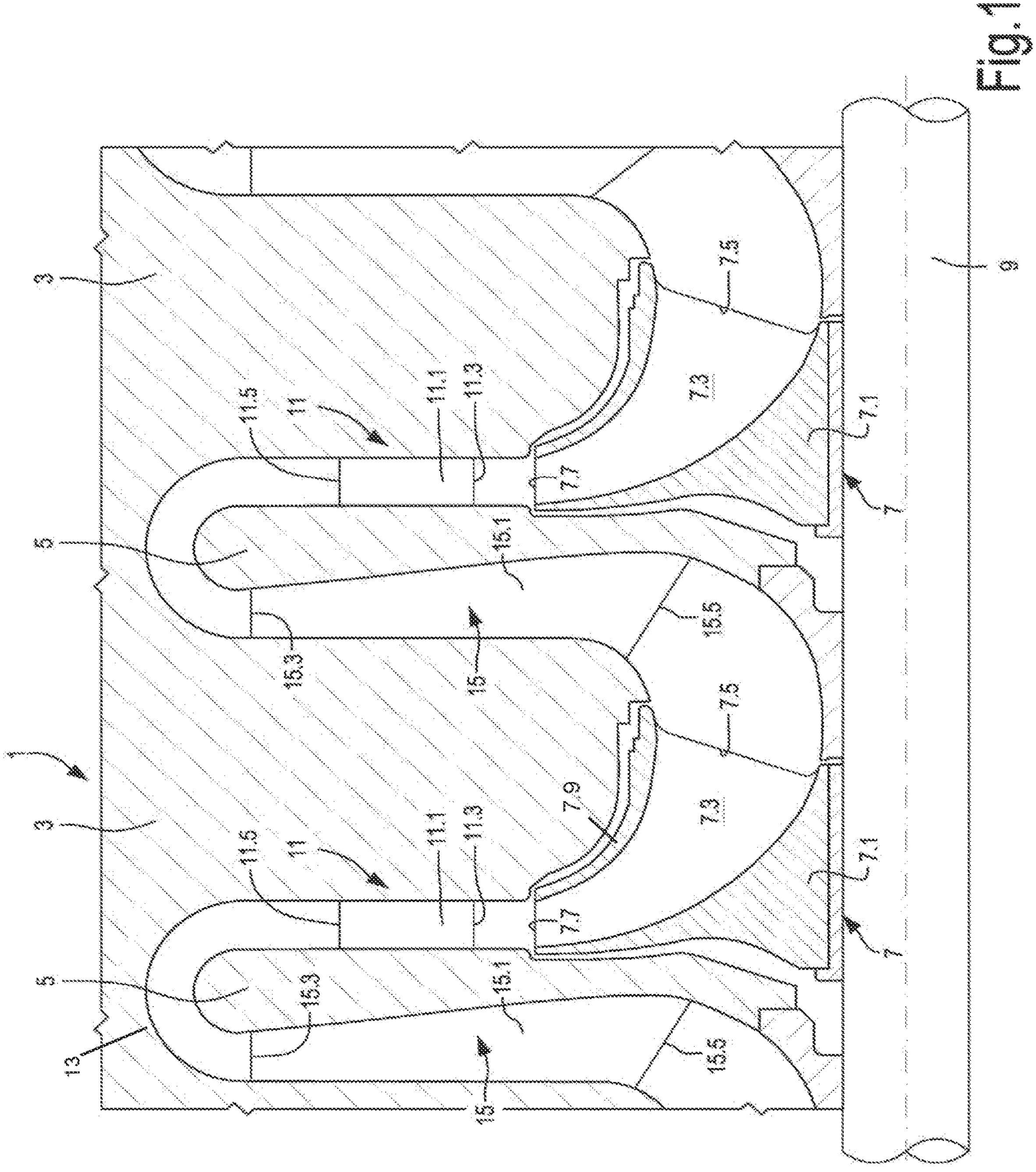
FIG. 1 illustrates a schematic sectional view of a portion of a compressor.

Referring now to FIG. 1, a portion of a centrifugal compressor 1 is shown. The section of FIG. 1 is limited to two stages of the centrifugal compressor. The number of compressor stages, and therefore the number of impellers, can differ from one compressor to another according to compressor design and compressor requirements. The novel features of a return channel according to the present disclosure can be embodied in one, some or preferably all the return channels provided in the compressor.

The compressor comprises a stationary part 3, such as a casing 3, wherein diaphragms 5 separating consecutive compressor stages are arranged. Each compressor stage comprises an impeller 7 supported for rotation in the casing 3. The impeller 7 can be shrink-fitted on a rotary shaft 9. In other embodiments, not shown, the impeller 7 can be a stacked impeller, according to a design known to those skilled in the art of centrifugal compressors, and not disclosed herein. The impellers 7 and the shaft 9 cumulatively form a compressor rotor, arranged for rotation in the casing 3 around a rotation axis A-A. The impeller 7 has an impeller hub 7.1, wherefrom a plurality of impeller blades 7.3 project. Each impeller blade 7.3 has a leading edge 7.5 and a trailing edge 7.7. The leading edges 7.5 are arranged along an impeller inlet and the trailing edges 7.7 are arranged along an impeller outlet. In the embodiment shown in FIG. 1 the impeller 7 further comprises a shroud 7.9. In other embodiments, the impeller 7 can be an un-shrouded impeller, in which case the shroud 7.9 would be omitted.

Around each impeller outlet, a diffuser 11 is arranged. Each diffuser 11 surrounds the outlet of the impeller 7 and is coaxial therewith, i.e. the center axis of the diffuser 11 coincides with the rotation axis A-A of the impellers 7.

In the embodiment of FIG. 1, the diffusers 11 are so-called vaned diffusers or bladed diffusers. Each vaned diffuser is provided with a plurality of diffuser vanes 11.1 arranged around the rotation axis A-A. The purpose of the diffuser vanes 11.1 is to re-direct the incoming gas flow in a more radial direction, i.e. to reduce the tangential component of the velocity of the gas flow entering the diffuser 11 and increase pressure recovery and overall stage efficiency. Each diffuser vane 11.1 comprises a leading edge 11.3 and a trailing edge 11.5.

In other embodiments, the diffusers 11 can be non-vaned diffusers, i.e. the diffuser vanes 11.1 can be omitted.

Downstream of each diffuser 11, except the one following the most downstream impeller (not shown) a return bend 13 is provided. The return bend 13 creates a 180-degree turn in the direction of the gas flow exiting the diffuser 11, from radially outward to radially inward. Following the return bend 13, a return channel 15 is provided, which directs the gas flow from the return bend 13 inward to the next impeller 7. The function of the return channel is to uniformly deliver the gas flow to each impeller 7 downstream thereof with minimal losses. Each return channel 15 is provided with a plurality of return channel vanes or blades 15.1. Each pair of adjacently arranged return channel vanes 15.1 forms a gas flow passage therebetween. The shape and distribution of the return channel vanes 15.1 will be described in greater detail below. As noted above, the most downstream diffuser is not provided with a return bend 13, but is rather fluidly coupled to a scroll, not shown, which collects the gas flow from the last compressor stage. The scroll is in turn fluidly coupled to the compressor outlet (not shown).

Figure 2:
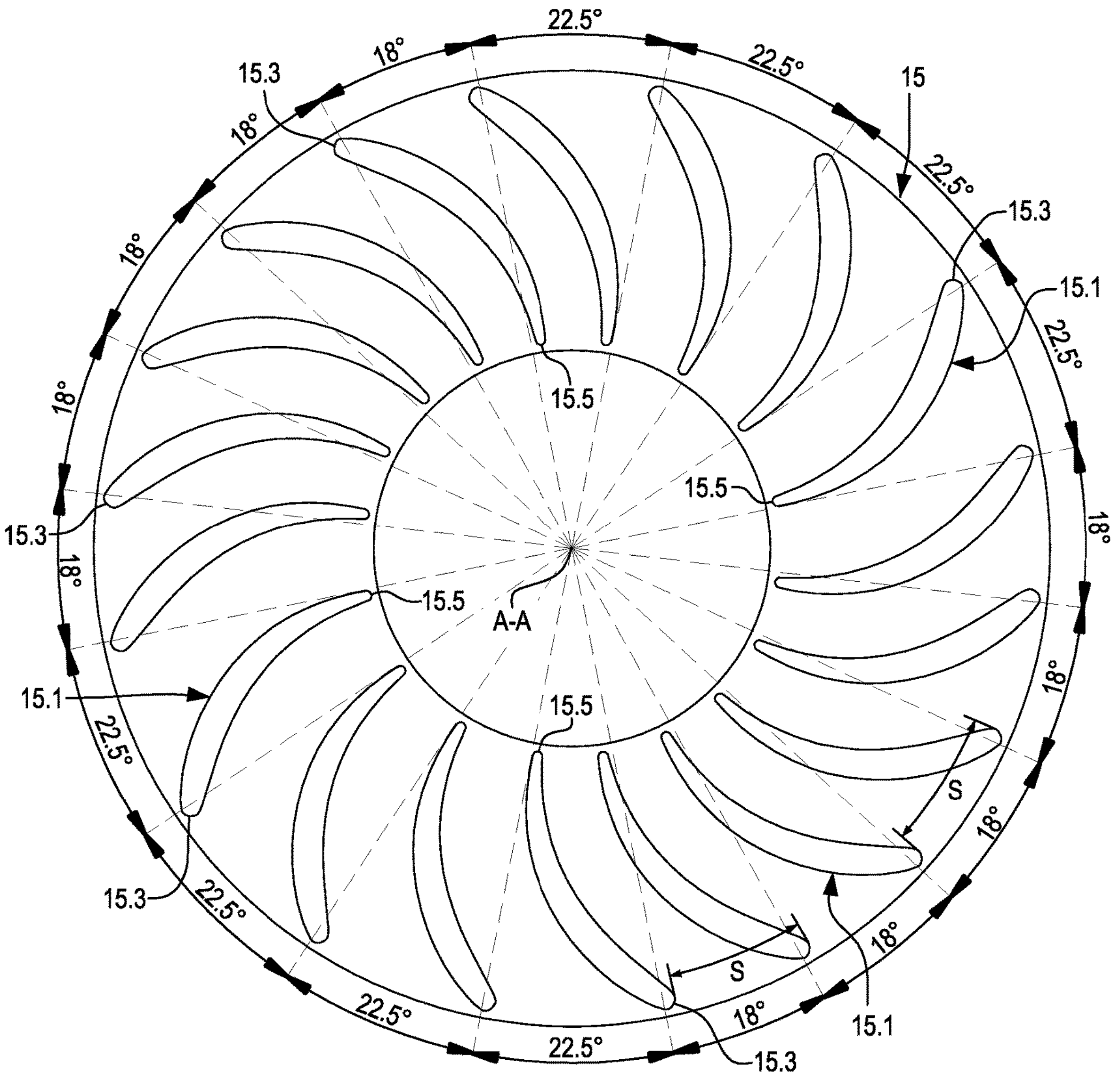
FIG. 2 illustrates a schematic sectional view of a return channel according to a plane orthogonal to the rotation axis, in one embodiment.
Figure 3:
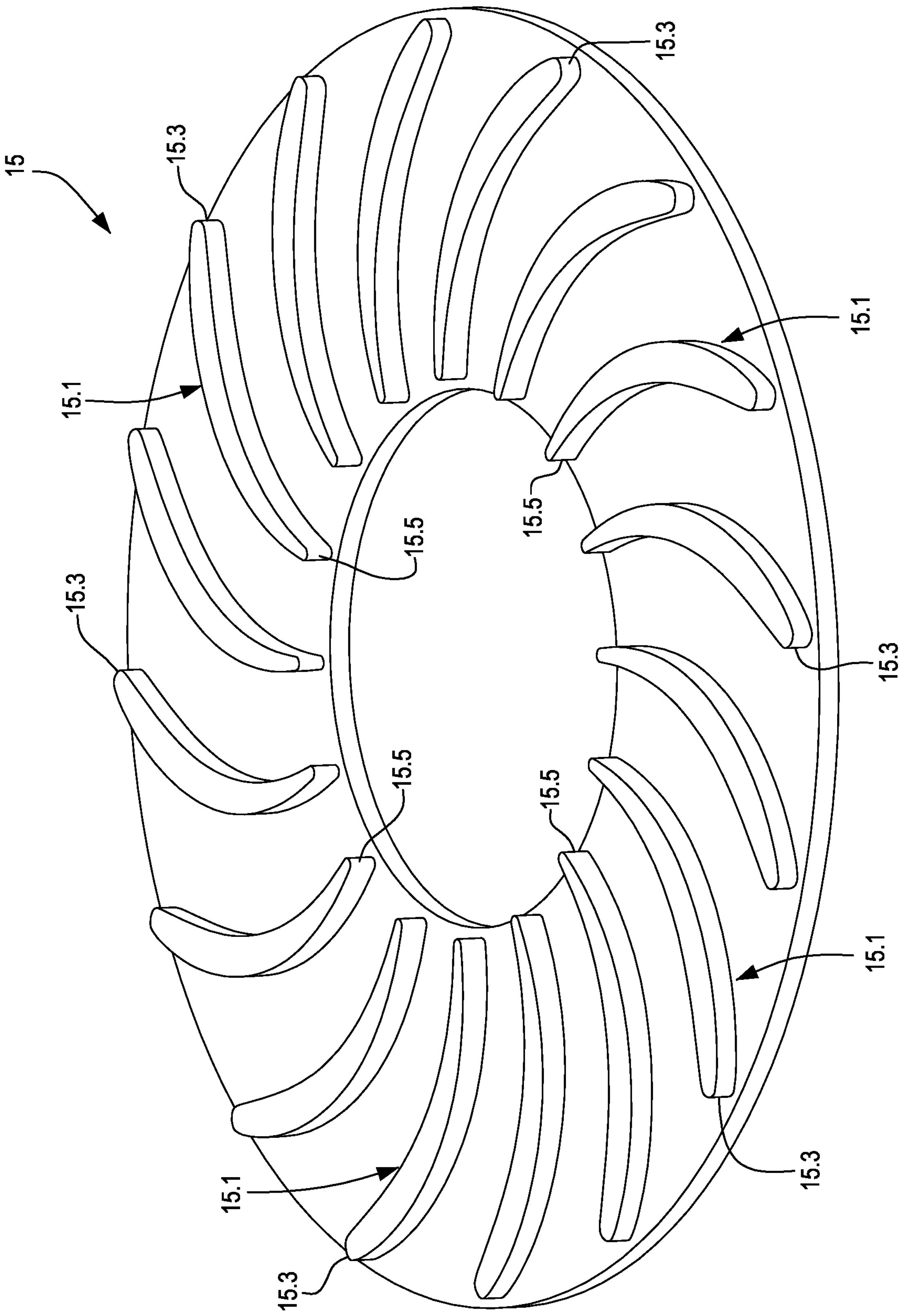
FIG. 3 illustrates an isometric view of a portion of the return channel.

With continuing reference to FIG. 1, FIGS. 2 and 3 show a sectional view and an isometric view of one of the return channels 15 and relevant return channel vanes 15.1 in one embodiment. A similar configuration can be provided for all return channels 15 of the compressor 1, or for some of them.

The return channel vanes 15.1 are circumferentially arranged around the return channel axis, which coincides with the rotation axis A-A. Each return channel vane 15.1 comprises a leading edge 15.3 and a trailing edge 15.5. The leading edges 15.3 are arranged at a first distance from the axis A-A and the trailing edges 15.5 are arranged at a second distance from the axis A-A, the second distance being smaller than the first distance.

In some embodiments, the return channel blades 15.1 can have a curved shape, with a concave pressure side and a convex suction side, both extending from the leading edge to the trailing edge, as shown in FIG. 2. Other simpler shapes can be provided, where the suction side and pressure side of each vane are substantially symmetrical with respect to a camber line of the vane.

In the embodiment of FIG. 2 the return channel blades 15.1 all have the same shape. Moreover, the return channel blades 15.1 are all arranged at the same distance from the center axis A-A of the return channel 15, such that the leading edges 15.3 and the trailing edges 15.5 of the return channel vanes 15.1 are all arranged on an outer and on an inner circumference, respectively. This, however, is not mandatory and alternative embodiments are possible. For instance, the return channel vanes 15.1 may have a variable chord. The chord is the distance between the leading edge and the trailing edge of the vane. Moreover, the trailing edges and/or the leading edges can be arranged at a variable radial distance from the center axis A-A of the return channel 15. I.e., there can be at least two return channel vanes 15.1 having the respective trailing edges 15.5 arranged at two different distances from the center axis A-A and/or at least two return channel vanes 15.1 can have respective leading edges 15.3 arranged at two different distances from the center axis A-A.

Additionally, the return channel 15 may have a variable profile and/or a variable height both in tangential direction, as well as in flow direction. Moreover, the return channel vanes 15.1 may also have a variable inclinations.

As shown in FIG. 2, the spacing S, i.e. the pitch between two adjacent or consecutive return channel vanes 15.1 forming a respective flow passage therebetween, is non-constant. The pitch or spacing variation can follow different criteria. The embodiment of FIG. 2 provides for 18 vanes, arranged to form four 90° sectors. Two of said sectors include five vanes arranged at 18° from one another, while the other two sectors include four vanes arranged at 22.5°. The angle between each pair of adjacent return channel vanes 15.1 is indicated for each flow passage in FIG. 2. In this embodiment, therefore, the distribution of the return channel vanes 15.1 is regular, i.e. the distribution pitches are repeated in subsequent sectors around the full 360° extension of the return channel 15.

Figure 4:
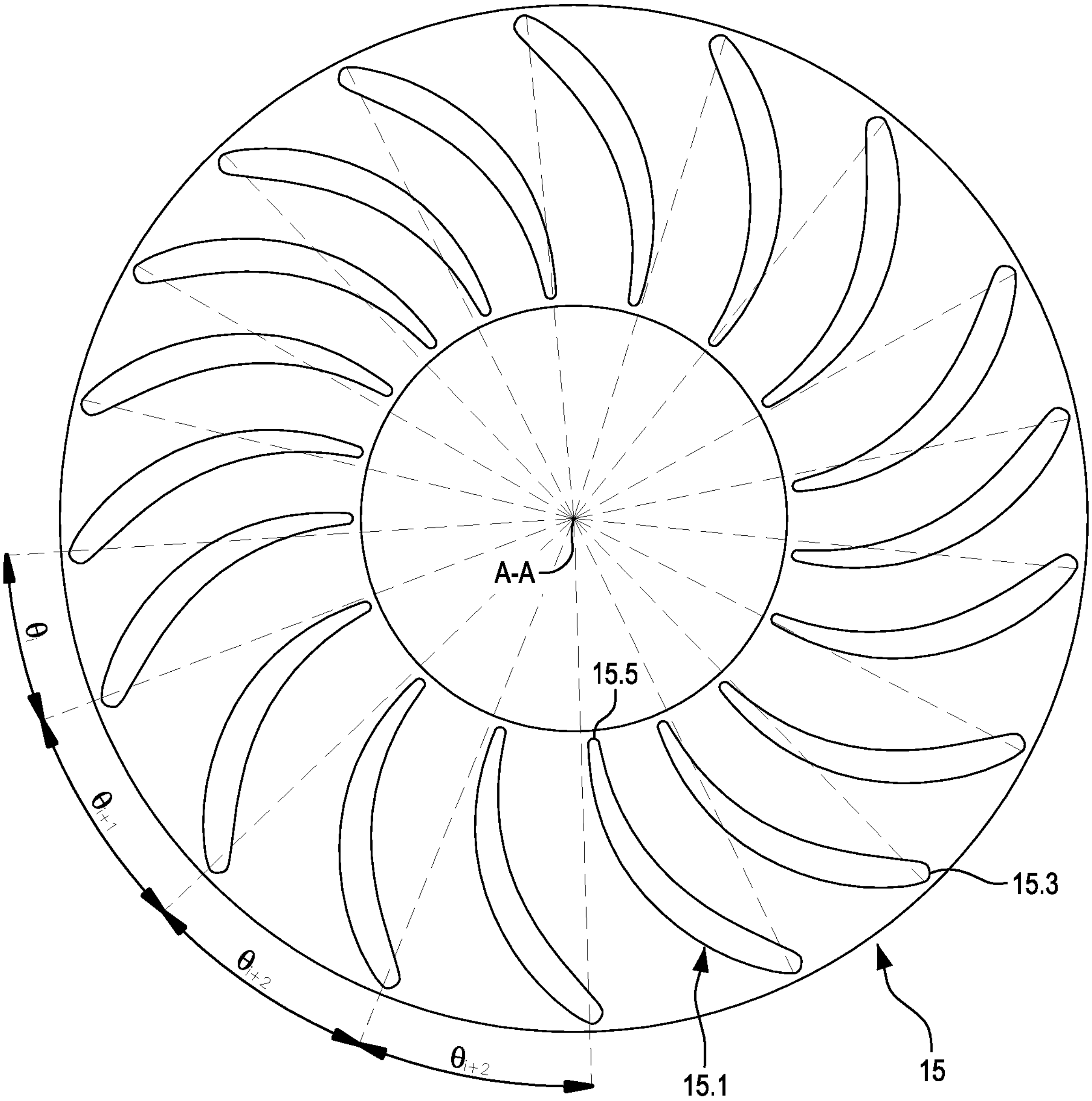
FIG. 4 illustrates a schematic sectional view of a return channel according to a plane orthogonal to the rotation axis, in another embodiment.

In other embodiments, the distribution can be entirely random, as shown for instance in FIG. 4. Here, 18 return channel vanes 15 are arranged such that the angle between consecutive, i.e. adjacent return channel vanes 15.1 defining respective flow passages varies randomly, for instance from a minimum value of 170 to a maximum value of 23°. A variable angular spacing corresponds to a variable pitch between pairs of adjacent return channel vanes 15.1.

Figure 5:
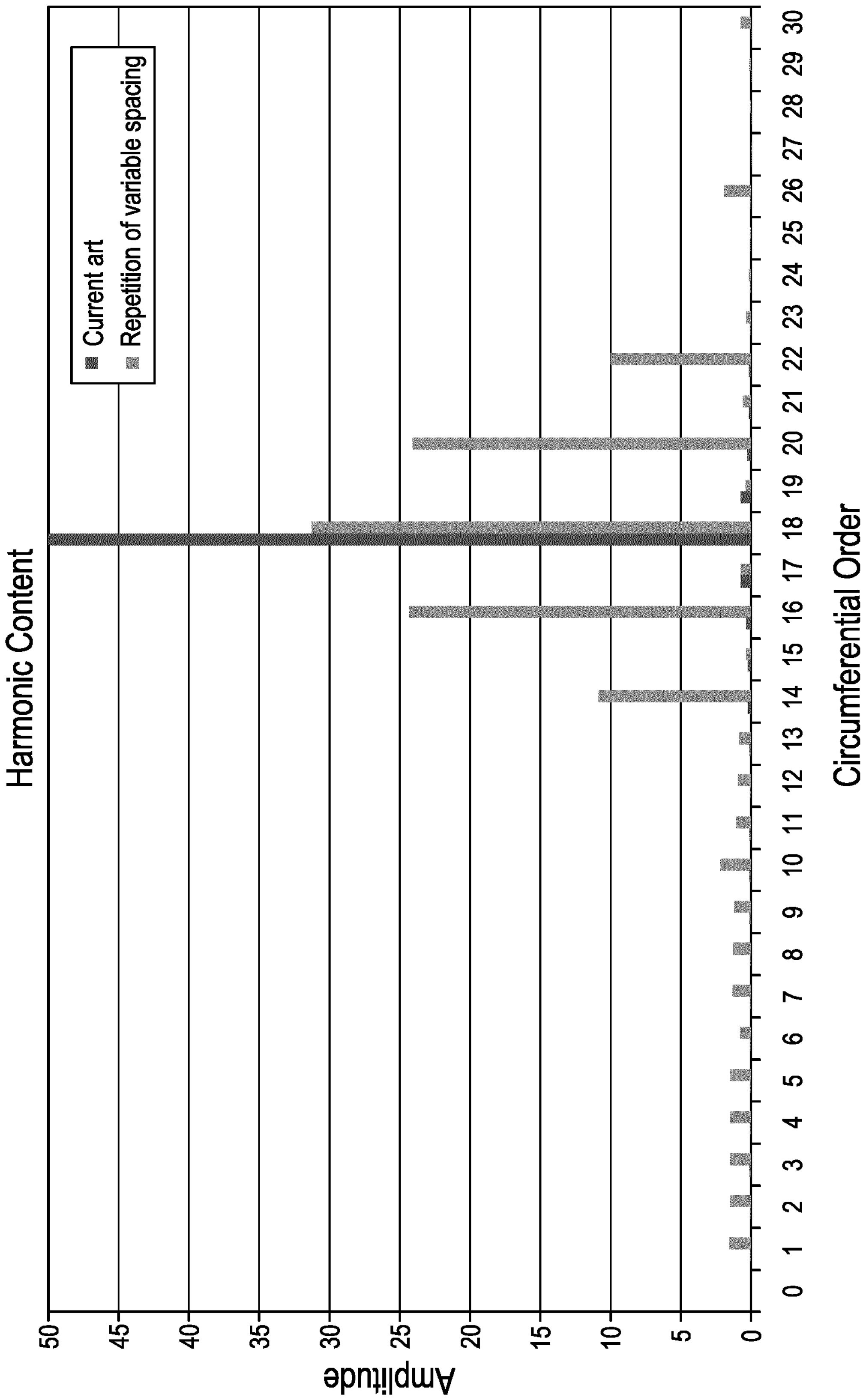
FIGS. 5 and 6 illustrate comparative diagrams showing the harmonic content analysis of impeller vibrations in an embodiment according to the background art and in the embodiments of FIGS. 2 and 4.
Figure 6:
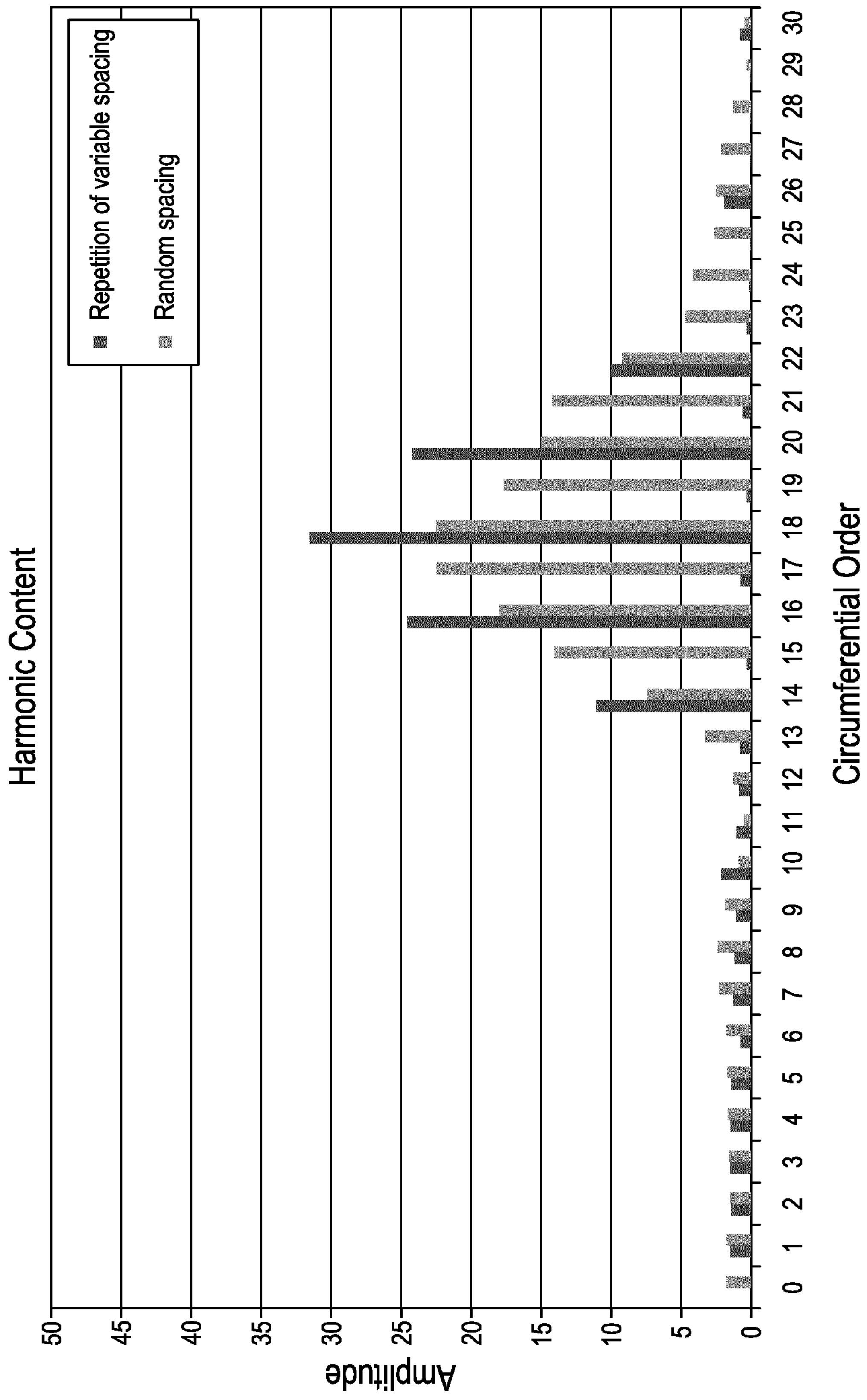

The effect of the non-uniform, i.e. non-constant distribution of return channel vanes 15.1 on the vibration of the impeller blades 7.3 can be appreciated from the two diagrams of FIGS. 5 and 6, which illustrate the respective harmonic content, representative of excitation sources, in three different situations. In both diagrams the circumferential order is plotted on the horizontal axis and the amplitude is plotted on the vertical axis.

More specifically, in FIG. 5 the harmonic content in a centrifugal compressor of the current art is shown in comparison with the harmonic content in a compressor including a distribution pattern of the return channel vanes 15.1 according FIG. 2, i.e. a regular repetition of two different pitches at 18° and 22.5°, respectively. The harmonic content is substantially increased by the non-constant pitch, and the excitation amplitude is reduced.

The embodiment of FIG. 4 represents a further improvement over the embodiment of FIG. 2, as can be appreciated from the FIG. 6. The diagram shown in FIG. 6 illustrates the harmonic content in the embodiment of FIG. 2, compared with the harmonic content in the embodiment of FIG. 4, according to which the return channel vanes 15.1 are arranged in a fully random manner. The harmonic content is further increased and the maximum excitation amplitude is further reduced compared to the embodiment of FIG. 2.

As a further improvement, the pitch and the chord of the return channel vanes 15.1 may be related to each other for further improving the efficiency of the turbomachine. More in detail, the pitch and the chord can be selected such that the solidity of the relevant flow passage defined between two adjacent return channel vanes 15.1 remains substantially constant. The solidity is the ratio between the vane chord (i.e. the distance between the trailing edge and the leading edge of the vane) and the pitch between two consecutive vanes. In the present context, the definition "substantially constant" may be understood as a solidity which is within a range of +/−20% around a constant pre-set solidity value. According to embodiments disclosed herein, "substantially constant" can be understood as a solidity which is maintained within a range of +/−10% around the pre-set constant solidity value and preferably a range of +/−5%, and more preferably a range of +/−2%.

The correlation between chord and pitch is such that the solidity reduction which would be caused by an increased pitch between return channel vanes 15.1 is offset, at least in part, by an increase in chord length.

More specifically, the chord B of the return channel vanes 15.1 is correlated to the pitch, i.e. to the spacing S between consecutive or adjacent return channel vanes 15.1, such that an increased chord B of one of the return channel vanes 15.1 forming a passage between consecutive return channel vanes 15.1 rebalances the passage solidity as follows:

$$\sigma_{P1} = \frac{B1}{S1} \approx \frac{B2}{S2} = \sigma_{P2}$$

wherein Bi is the chord of one of the two return channel vanes 15.1 defining the $i^{th}$ passage Pi. More specifically, Bi is the chord of the return channel vane, the suction side whereof faces the $i^{th}$ passage Pi. The solidity of a return channel flow passage is defined, in the present case, as the ratio between the chord of the return channel vane 15.1, the suction side whereof faces the flow passage, and the pitch between the two return channel vanes 15.1, between which the flow passage is defined.

By making the chord B of the first return channel vane 15.1 of each $i^{th}$ flow passage Pi dependent upon the pitch or spacing Si between the two return channel vanes forming the passage, the effect of solidity variation provoked by the pitch variation is balanced by the chord variation.

Thus, the beneficial effect of a pitch variation in terms of reduction of impeller vibrations is achieved without the negative impact on compressor operability, by balancing the solidity reduction, which would be caused by an increased pitch, with an increase of the chord of the relevant return channel vane 11.1.

In preferred embodiments, the relationship between each return channel vane chord Bi and the pitch or spacing Si of each $i^{th}$ flow passage Pi is such that the solidity $\sigma_{Pi}$ of the flow passage remains constant.

However, a strictly constant solidity value is not mandatory. Beneficial effects in terms of enhanced compressor operability can be achieved also if the solidity maintained substantially constant around a pre-set value. According to embodiments disclosed herein, "substantially constant" can be understood as a solidity which is maintained within a range of +/−10% around the pre-set constant solidity value and preferably a range of +/−5%, and more preferably a range of +/−2%.

For an improved vibration reduction, also the diffuser vanes 11.1 can be arranged according to variable, i.e. non-constant or non-uniform pitches.

The above described embodiments specifically refer to centrifugal compressors. However, the novel return channels according to the present disclosure can be used with advantage also in centrifugal pumps, having a structure similar to the one shown in FIG. 1

Exemplary embodiments have been disclosed above and illustrated in the accompanying drawings. It will be understood by those skilled in the art that various changes, omissions and additions may be made to that which is specifically disclosed herein without departing from the scope of the invention as defined in the following claims.

The invention claimed is:

1. A return channel for a centrifugal turbomachine, the return channel comprising:

a plurality of return channel vanes arranged around a return channel axis, wherein each return channel vane comprises:

a leading edge at a first distance from the return channel axis; and a trailing edge at a second distance from the return channel axis, the second distance being smaller than the first distance, wherein a flow passage is defined between each pair of adjacently arranged return channel vanes, wherein the return channel vanes have a chord that defines a distance between the leading edge and the trailing edge, wherein the return channel vanes are spaced apart from one another by a pitch around the return channel axis, wherein the pitch has a distribution around the return channel axis that arranges the flow passages into sectors, each sector corresponding to an angular portion of the return channel vane as measured around the return channel axis, wherein each sector comprises more than one of the flow passages, wherein the second distance is the same for all the return channel vanes, wherein the pitch is the same within each sector, wherein the pitch changes between adjacent sectors around the return channel axis, and wherein the pitch and the chord are selected so that the flow passages have a solidity that is constant.

2. The return channel of claim 1, wherein the return channel vanes have profiles that are the same in a tangential direction.

3. The return channel of claim 1, wherein the return channel vanes have an inclination that is the same.

4. The return channel of claim 1, wherein the return channel vanes have a return channel height that is the same in a tangential direction.

5. A centrifugal turbomachine, comprising:

a stationary part;

a first impeller and a second impeller arranged for rotation around a rotation axis;

a first diffuser surrounding the first impeller and a second diffuser surrounding the second impeller, the first diffuser and the second diffuser being adapted to convert velocity of a fluid flow from the first impeller and the second impeller into pressure; and a return channel according to claim 1 that is arranged between the first diffuser and the second impeller.

6. The centrifugal turbomachine of claim 5, wherein the turbomachine is a centrifugal compressor.

7. The return channel of claim 1, wherein the first distance is the same for all the plurality of return channel vanes.

8. The return channel of claim 1, wherein the return channel vanes have a profile that is the same in a flow direction.

9. The return channel of claim 1, wherein the return channel vanes have a height that is the same in a flow direction.

10. The return channel of claim 1, wherein the sectors comprise a first group of return channel vanes having a first pitch between adjacent return channel vanes and a second group of return channel vanes having a second pitch between adjacent return channel vanes, and wherein the first pitch is different that the second pitch.

* * * * *